Patented Apr. 22, 1952

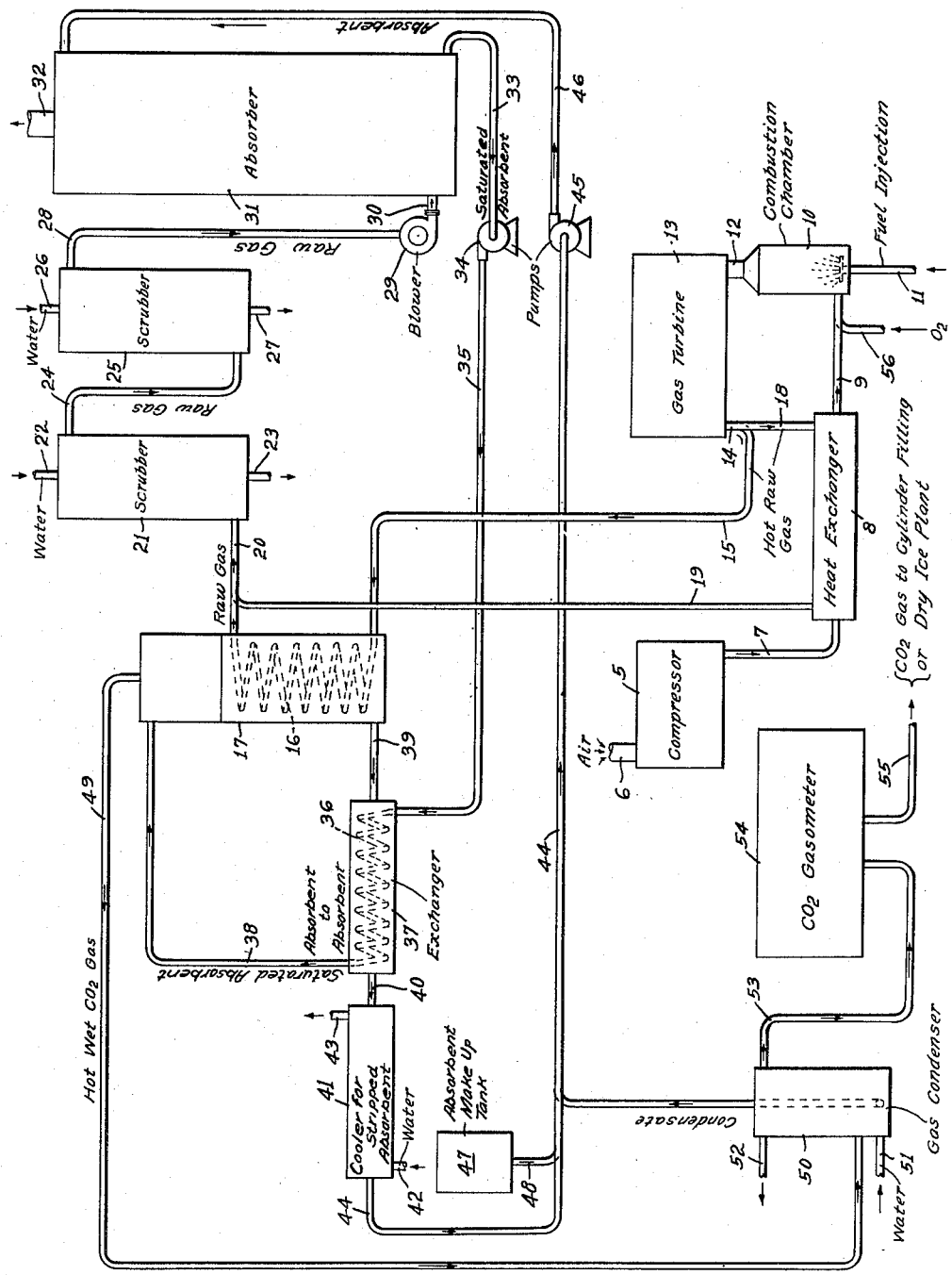

2,593,530

UNITED STATES PATENT OFFICE 2,593,530

PRODUCTION OF CARBON DIOXIDE

Robert Bridges, New Rochelle, N. Y., assignor to Air Reduction Company, Incorporated, New York, N. Y., a corporation of New York Application December 11, 1947, Serial No. 791,137

3 Claims. (Cl. 23—150)

This invention relates to the production of carbon dioxide, and more particularly to an improved method affording a more economical source of that gas, together with the recovery and utilization of heat and power of the fuel consumed in an economical manner.

The demand for carbon dioxide, for use in the production of solid carbon dioxide and for other purposes, is steadily increasing. Some of the carbon dioxide so used is recovered from stack gases resulting from the combustion of fuels. The methods heretofore in use are crude and uneconomical, involving, as they do, numerous sources of loss of the available energy of the fuel consumed. The cost of producing solid carbon dioxide is correspondingly increased.

It is the object of the present invention to provide an improved and economically effective method of converting fuel into carbon dioxide and of limiting losses which are inherent in the methods as heretofore practised.

Other objects and advantages of the invention will be apparent as it is better understood by reference to the following specification and the accompanying drawing, which illustrates diagrammatically an apparatus suitable for the practice of the improved method.

In carrying out the present invention, I employ a gas turbine to which combustion gases are supplied. The gas turbine is an extremely efficient means for recovering from the combustion gases the energy stored therein. This energy may be utilized for many purposes in the plant in which the apparatus is installed, for example, in driving the compressor by which air under pressure is supplied to the combustion chamber. It may be utilized also in driving a generator for the purpose of producing electric current. The gas, after expansion in the turbine, is delivered, still at a considerable pressure which is sufficient to force it through the equipment employed for separating the carbon dioxide therefrom, thus permitting elimination of blowers for that purpose and the cost of installing and operating such devices. The heat of the expanded combustion gases may be utilized also in the expeller to separate the carbon dioxide which is dissolved from the gases. Thereby another saving is effected in the operation. The gases may be scrubbed with any suitable absorption or dissolving agent to separate the carbon dioxide therefrom, such as soda or potash lye or monoethanolamine. After the scrubbing operation, the scrubbing liquid may be heated as indicated by the expanded combustion gases to eliminate the absorbed or dissolved carbon dioxide, and the latter may be stored. The scrubbing liquid is then reused in the operation.

While the method may be conducted with compressed air as an oxidizing agent for the fuel, it is possible also to use oxygen or oxygen-enriched air as the combustion agent. In the event that relatively pure oxygen, derived from a liquefaction system, is utilized, it is unnecessary to employ the compressor, since the combustion will generate sufficient pressure to operate the turbine.

Referring to the drawing, 5 indicates a compressor having an air inlet 6. The compressed air is delivered through a pipe 7 to a heat exchanger 8 where the air is heated by heat exchange with a portion of the expanded combustion products. From the heat exchanger 8, the air is delivered through a pipe 9 to a combustion chamber 10, which is fed with fuel, either gaseous or liquid, through a pipe 11. The fuel is burned in the combustion chamber, and the combustion gases at relatively high pressure are delivered through a pipe 12 to a gas turbine 13 where the gases are expanded with the production of external work. The energy derived from the heated combustion products may be utilized in driving the compressor 5 and for other useful purposes. The gas turbine is operated at back pressure so that the expanded combustion products delivered therefrom through the pipe 14 will pass through the remainder of the system without the necessity for further compression.

A part of the expanded combustion products is delivered through the pipe 15 to a coil 16 in the expeller 17 where the absorbed or dissolved carbon dioxide is released from the absorbing liquid by the heat carried by the gases. The remainder of the expanded combustion products is delivered through a pipe 18 to the exchanger 8, passing in heat exchange relation with the compressed air before the latter is delivered to the combustion chamber. From the heat exchanger 8, the combustion products are delivered through a pipe 19 to a pipe 20 which is connected to the coil 16.

All of the combustion products are combined in the pipe 20 and delivered thereby to a scrubber 21 which is supplied with water through an inlet 22. The water escapes through an outlet 23. The water-soluble contents of the combustion products are partially removed in the scrubber 21 and are delivered through a pipe 24 to a second scrubber 25 supplied with water through an inlet 26. The water escapes through an outlet 27. In the second scrubber, the combustion products are thoroughly washed with respect to water-soluble constituents and escape through a pipe 28. The combustion products may then be partially compressed in a blower 29, although this element may be omitted if sufficient pressure is maintained at the outlet of the gas turbine 13. From the blower 29, the combustion products are delivered through a pipe 30 to an absorber 31, being subjected therein to the action of the absorbing liquid such as monoethanolamine or any other suitable absorbing agent which will selectively absorb or dissolve carbon dioxide from the combustion products. The unabsorbed residue escapes through an outlet 32.

The absorbing liquid, with the carbon dioxide dissolved therein, is delivered through a pipe 33 and a pump 34 to a pipe 35 which delivers the liquid to a coil 36 in a heat exchanger 37, where it passes in heat exchange relation with the solution from which the carbon dioxide has been removed in the expeller 17. Thence the solution passes through a pipe 38 to the expeller 17, where it is heated by the combustion products in the coil 16. The solution from which the carbon dioxide has been removed is delivered, through a pipe 39, to the heat exchanger 37, and thence through a pipe 40 to a cooler 41 supplied with cooling water through an inlet 42. The water escapes through a pipe 43. Thence the spent solution returns through a pipe 44, pump 45 and pipe 46, to the absorber 31 for re-use. Additional solution may be introduced from a tank 47 through a pipe 48 to make up any loss in the system.

The carbon dioxide which is released in the expeller 17 escapes through a pipe 49 and is delivered to a condenser 50, through which water is circulated by means of pipes 51 and 52. Thence the carbon dioxide passes through a pipe 53 to the gasometer 54 where it may be held for storage. From the gasometer, it may be withdrawn through a pipe 55, compressed in the usual manner, and cooled to liquefy the carbon dioxide.

As hereinbefore indicated, the essential feature of the invention is the utilization of the gas turbine in the recovery of energy from the combustion products. The gas turbine can be operated at a back pressure sufficiently high to carry the combustion products through the entire absorption system, including the water scrubbers. By operating the turbine at a back pressure, this advantage can be secured, while at the same time a highly efficient energy recovery is maintained. The cost of installation of a system as described is much lower than in the case of a steam boiler such as has been utilized heretofore in the recovery of heat from combustion gases prior to the separation of carbon dioxide therefrom. Various fuels may be utilized in the system as described.

Where oxygen is available at sufficiently low cost, as in the case of low purity oxygen produced on a large scale by liquefaction, it may be introduced through a pipe 56. In that event, the compressor 5 and the heat exchanger 8 are unnecessary and may be eliminated.

Various changes may be made in the form and arrangement of the apparatus and in the details of operation of the method without departing from the invention or sacrificing the advantages thereof.

I claim:

1. The method of producing carbon dioxide which comprises burning a fuel to provide combustion gases, thereafter expanding the combustion gases without previous substantial loss of pressure and with the development of external work, scrubbing the expanded combustion gases, passing the scrubbed expanded combustion gases through an absorption zone where the carbon dioxide content of the gases is selectively dissolved in a solvent therefor, passing the solution from the absorption zone containing the dissolved carbon dioxide into heat exchange relationship with the hot combustion gases after they have been expanded and before being scrubbed to expel carbon dioxide therefrom, collecting the expelled carbon dioxide gas, passing the solvent from which the carbon dioxide was expelled in heat exchange relationship with the solution from the absorption zone passing to the expelling zone to preliminarily heat such solution before it is brought into heat exchange relationship with the expanded combustion gases, cooling the solvent from which the carbon dioxide was expelled after it is passed into heat exchange relationship with the solution from the absorption zone, and returning the cooled solvent to the absorbing zone.

2. The method of producing carbon dioxide which comprises burning a fuel to provide combustion gases, expanding the combustion gases in a gas turbine without previous substantial loss of pressure, scrubbing the expanded combustion gases, introducing the scrubbed expanded combustion gases into a liquid absorbent in which the carbon dioxide of the combustion gases is selectively absorbed, bringing the absorbent containing carbon dioxide absorbed from the combustion gases into heat exchange relationship with the hot combustion gases after they have been expanded and before being scrubbed to expel carbon dioxide therefrom, collecting the expelled carbon dioxide, passing the absorbent resulting from the expulsion of carbon dioxide therefrom in heat exchange relationship with the absorbent passing from the absorber to the expelling zone to preliminarily heat the absorbent containing absorbed carbon dioxide before it is brought into heat exchange relationship with the expanded combustion gases, cooling the absorbent from which carbon dioxide has been expelled after it is brought into heat exchange relationship with the absorbent containing absorbed carbon dioxide, and returning the cooled absorbent from which the carbon dioxide has been expelled to the absorption zone, the burning of the fuel to provide the combustion gases being under a pressure such that after driving the turbine they will be released at a pressure sufficient to force them through the scrubbing zone and into the absorption zone.

3. The method of producing carbon dioxide which comprises burning a fuel to provide combustion gases, expanding the combustion gases in a gas turbine without previous substantial loss of pressure, scrubbing the expanded combustion gases, introducing the scrubbed expanded combustion gases into a liquid absorbent in which the carbon dioxide of the combustion gases is selectively absorbed, bringing the absorbent containing carbon dioxide absorbed from the combustion gases into heat exchange relationship with the hot combustion gases after they have been expanded and before being scrubbed to expel carbon dioxide therefrom, collecting the expelled carbon dioxide, cooling the absorbent from which carbon dioxide has been expelled after it is brought into heat exchange relationship with the absorbent containing absorbed carbon dioxide, and returning the cooled absorbent from which the carbon dioxide has been expelled to the absorption zone, the burning of the fuel to provide the combustion gases being under a pressure such that after driving the turbine they will be released at a pressure sufficient to force them through the scrubbing zone and into the absorption zone.

ROBERT BRIDGES.

REFERENCES CITED

The following references are of record in the file of this patent:

UNITED STATES PATENTS

| Number | Name | Date |
|---|---|---|
| 740,700 | Schutz | Oct. 6, 1903 |
| 1,044,531 | Hunter | Nov. 19, 1912 |
| 1,817,908 | Belt | Aug. 11, 1931 |
| 1,931,817 | Hogan et al. | Oct. 24, 1933 |
| 1,934,472 | Allen | Nov. 7, 1933 |
| 1,952,005 | Willenborg | Mar. 20, 1934 |
| 2,048,656 | Hunt | July 21, 1936 |
| 2,142,545 | Willenborg | Jan. 3, 1939 |
| 2,389,636 | Ramseyer | Nov. 27, 1945 |
| 2,392,711 | Willenborg | Jan. 8, 1946 |

FOREIGN PATENTS

| Number | Country | Date |
|---|---|---|
| 7,463 | Great Britain | of 1837 |
| 25,867 | Great Britain | of 1903 accepted Nov. 26, 1904 |
| 1,744 | Great Britain | of 1907 accepted Jan. 16, 1908 |
| 263,922 | Great Britain | accepted Jan. 3, 1927 |
| 338,369 | Great Britain | accepted Nov. 20, 1930 |